(12) United States Patent
Purkett et al.

(10) Patent No.: US 8,891,200 B1
(45) Date of Patent: Nov. 18, 2014

(54) IMPEDANCE MITIGATION OF A MICROACTUATOR CONDUCTIVE JOINT

(71) Applicant: Seagate Technology LLC, Cupertino, CA (US)

(72) Inventors: John C. Purkett, Longmont, CO (US); David L. Schell, Fort Collins, CO (US); Robert A. Alt, Niwot, CO (US); KarWei Koay, Erie, CO (US)

(73) Assignee: Seagate Technology LLC, Cupertino, CA (US)

( * ) Notice: Subject to any disclaimer, the term of this patent is extended or adjusted under 35 U.S.C. 154(b) by 22 days.

(21) Appl. No.: 13/925,526

(22) Filed: Jun. 24, 2013

(51) Int. Cl.
*G11B 5/596* (2006.01)
*G11B 21/24* (2006.01)
*G11B 5/48* (2006.01)

(52) U.S. Cl.
CPC .................................. *G11B 5/4873* (2013.01)
USPC .................. 360/78.05; 360/78.12; 360/294.4; 310/317

(58) Field of Classification Search
None
See application file for complete search history.

(56) References Cited

U.S. PATENT DOCUMENTS

| | | | |
|---|---|---|---|
| 5,959,808 A | 9/1999 | Fan et al. | |
| 6,100,623 A * | 8/2000 | Huang et al. | 310/317 |
| 7,072,134 B1 | 7/2006 | Hirano et al. | |
| 7,079,338 B1 | 7/2006 | Semba et al. | |
| 7,342,740 B1 | 3/2008 | Lee et al. | |
| 8,467,144 B2 * | 6/2013 | Lim et al. | 360/78.05 |
| 8,570,688 B1 * | 10/2013 | Hahn et al. | 360/294.4 |
| 2010/0201290 A1 | 8/2010 | Becker et al. | |
| 2012/0281310 A1 | 11/2012 | Lim et al. | |

* cited by examiner

*Primary Examiner* — Andrew L Sniezek
(74) *Attorney, Agent, or Firm* — Hall Estill Attorneys at Law

(57) ABSTRACT

Apparatus and method for mitigating impedance changes in a microactuator conductive joint. In accordance with some embodiments, a microactuating element has a conductive input junction, the junction having dissimilar metals in contact with one another. The microactuating element is adapted to mechanically deform to displace a control object responsive to a micractuation control signal that is applied to the junction. A control circuit applies a bi-directional transition signal to the conductive input junction to reduce an increased impedance of the junction.

20 Claims, 8 Drawing Sheets

IMPEDANCE MITIGATION OF A MICROACTUATOR CONDUCTIVE JOINT

SUMMARY

Various embodiments of the present disclosure are generally directed to mitigating impedance changes in a microactuator conductive joint.

In accordance with some embodiments, a microactuating element has a conductive input junction with dissimilar metals in contact with one another. The microactuating element is adapted to mechanically deform to displace a control object responsive to a micractuation control signal that is applied to the conductive input junction. A control circuit is adapted to apply a bi-directional transition signal to the conductive input junction to reduce an increased impedance of the junction.

These and other features and aspects which characterize various embodiments of the present invention can be understood in view of the following detailed discussion and the accompanying drawings.

DETAILED DESCRIPTION

Figure 1A:
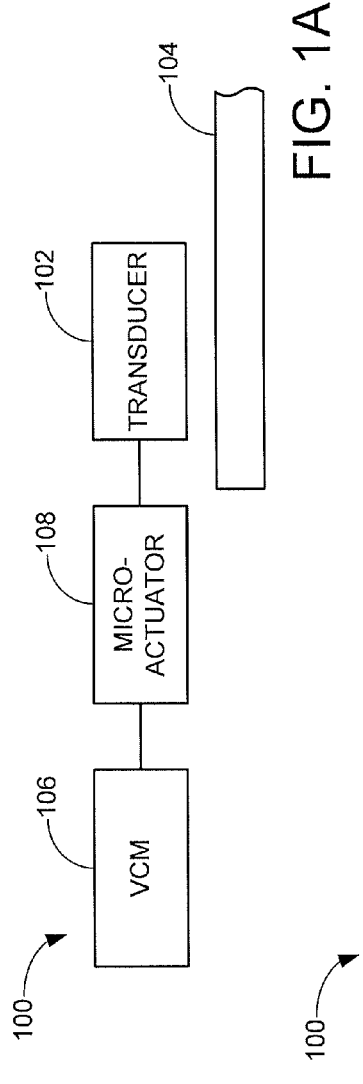
FIG. 1A provides is a functional block representation of a dual stage actuator system in accordance with some embodiments of the present disclosure.

Dual stage actuators are control systems that move a control object from an initial position to a destination position using parallel control paths. A dual stage actuator can be used in a data storage device to position a read/write data transducing head (transducer) adjacent a rotating magnetic recording medium surface. The actuator can use a voice coil motor (VCM) to provide coarse positional control of the transducer, and one or more microactuating elements, such as piezoelectric transducers (PZTs), to provide fine positional control of the transducer.

A PZT element is activated by the application of an input voltage which causes the PZT element to undergo a change in size and/or shape. The PZT element may be supplied with conductive terminals to facilitate electrical interconnection of the element with a suitable input voltage source. The terminals may be plated with gold or some other conductive material. A variety of connection mechanisms can be used to interconnect the PZT element such as through the use of silver epoxy, copper traces, soldering, connectors, etc.

An issue that sometimes arises with the use of PZT elements is a localized increase in impedance at an interconnection joint of the element. Changes in impedance can arise for a variety of reasons, including due to oxidation, microcracks, material migration, corrosion, etc. The incidence of impedance changes may occur at a significantly greater rate when dissimilar metals (e.g., gold/silver, etc.) are used in the interconnection joint interfaces. An increased junction impedance can alter the stability of a control loop used to provide control inputs to the PZT element, thereby reducing the accuracy of the microactuator control effort.

Accordingly, various embodiments of the present disclosure are directed to an apparatus and method for mitigating changes in impedance in a dual stage actuator system. As explained below, in some embodiments a microactuating element is provided to position a control object. The microactuating element comprises a conductive input junction having contacting dissimilar metals. The microactuating element is adapted to mechanically deform to displace the control object responsive to a microactuation control signal applied to the conductive input junction.

A control circuit applies a bi-directional transition signal to the conductive input junction to reduce an increased impedance thereof. The signal includes at least one leading edge and at least one trailing edge. Each of the leading and trailing edges provides a stepwise change in applied voltage to the junction. The signal is configured to provide a voltage input to the junction of sufficient magnitude to mitigate the corrosion, oxidation or other characteristic of the joint to restore the joint to its normal state without imparting a significant input to induce movement of the control object. In some cases, the control object is a data storage transducer that is positioned using a sampled servo control system having a response frequency range, and the frequency of the transition signal(s) is sufficiently high as to be outside the frequency range and therefore be ignored by the servo control system.

FIG. 1A is a functional block diagram of a dual stage actuator system 100. The system is implemented in a data storage device in which an array of data transducers 102 are controllably positioned adjacent a corresponding stack of rotatable data recording media 104. The dual stage actuator system 100 provides coarse positional control through a voice coil motor (VCM) 106 and fine positional control through a PZT based microactuator 108.

Figure 1B:
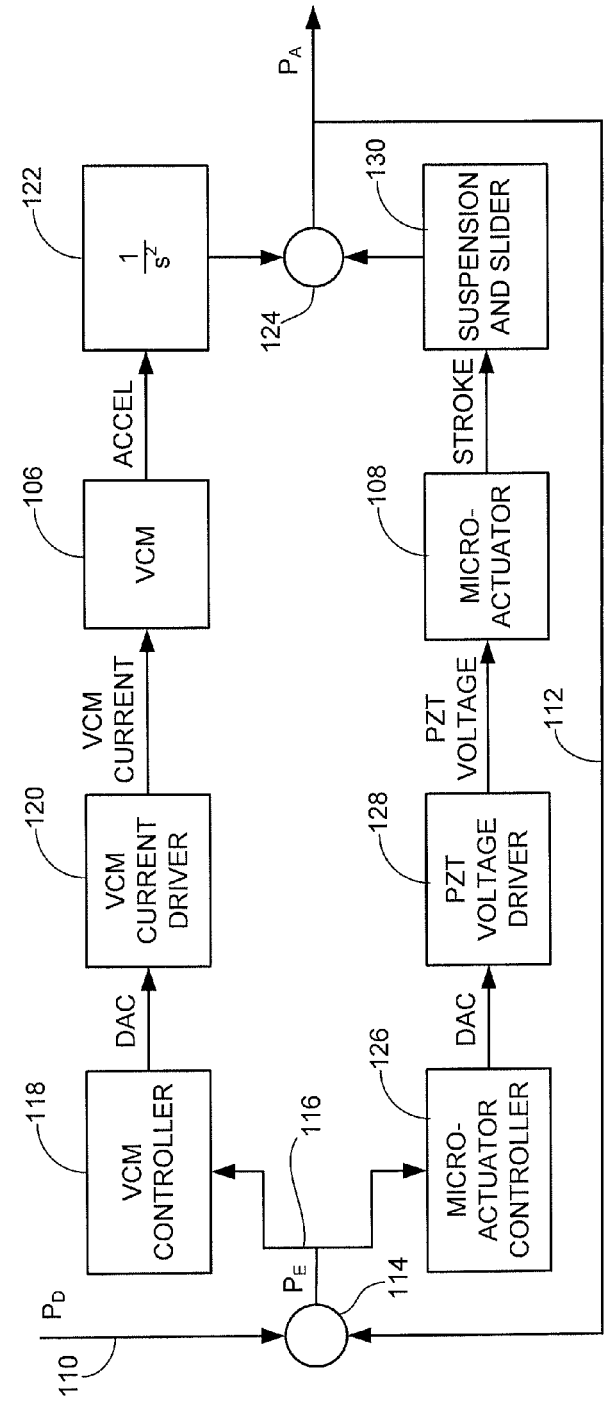
FIG. 1B is a control block diagram for the system of FIG. 1A.

FIG. 1B provides a control block diagram for the system 100 of FIG. 1A. The diagram can represent a sampled digital servo control loop which operates at a nominal sampling frequency over a selected response range. A desired position $P_D$ for a selected transducer 102 is input on path 110. An actual position signal $P_A$ from path 112 is summed at a summing junction 114 to provide a position error signal $P_E$ on path 116.

A coarse control stage and a fine control stage respectively use the error signal $P_E$ to derive control inputs for the VCM 106 and microactuator 108 of FIG. 1A. The coarse control stage includes a VCM controller 118 which, responsive to the input position error signal, outputs a digital control value to a VCM current driver 120, which in turn applies VCM current to the VCM 106. The VCM current induces acceleration of the transducer 102 which is transformed via second order block 122 to provide a position signal, which is received by summing junction 124.

The fine control stage includes a microactuator controller 126 which generates a DAC output to a PZT voltage driver 128. The voltage driver 128 generates a PZT driver voltage which is applied to the microactuator 108. The resulting stroke (mechanical displacement) is applied to a suspension and slider mechanism 130 coupled to the transducer. The output displacement of the suspension and slider mechanism 130 is combined at the summing junction 124 to provide the actual position $P_A$.

Generally, a change in position will be provided by the PZT microactuator 108 each time the PZT voltage changes to a new steady-state value. In a data storage device having multiple transducers and recording surfaces, a single PZT voltage may be applied to all microactuators simultaneously, so that all transducers are moved in parallel by a corresponding amount responsive to a single input.

Figure 2:
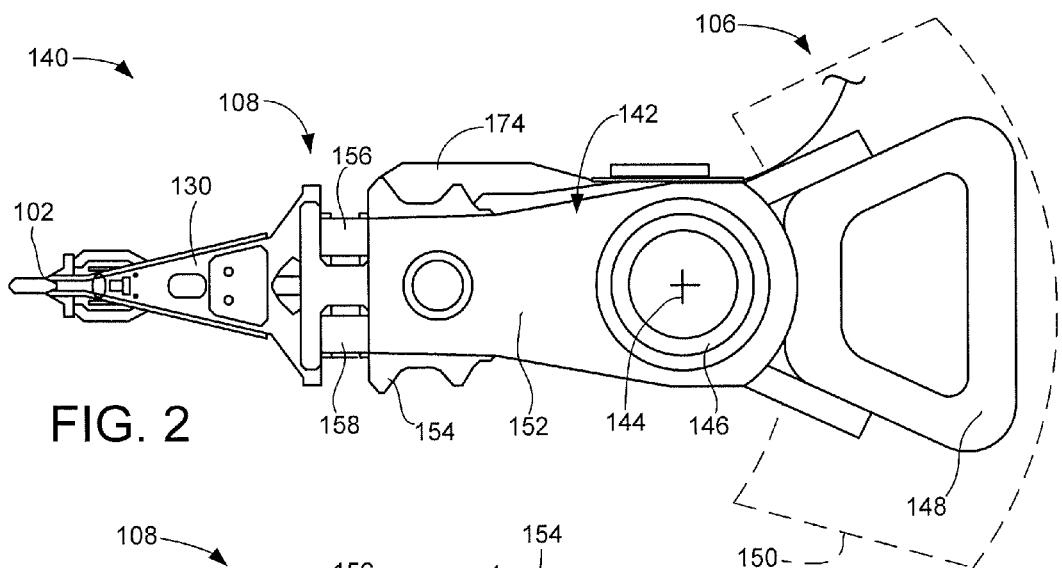
FIG. 2 depicts an actuator of the system of FIGS. 1A-1B.

FIG. 2 is a top plan view of an actuator 140 that can be incorporated into the system 100. A main body 142 is configured for rotation about a pivot point 144 via a cartridge bearing assembly 146. A voice coil 148 extends from the main body 142 and is immersed in a magnetic field from magnet 150 of the VCM 106. A rigid actuator arm 152 extends from the main body and is attached to an attachment plate 154 of a head/suspension assembly.

Figure 3A:
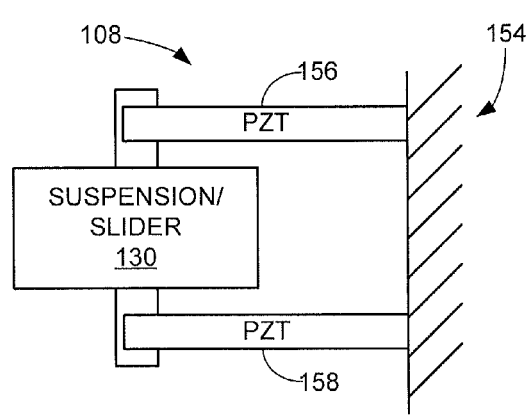
FIGS. 3A and 3B schematically depict operation of a microactuator portion of the actuator of FIG. 2.
Figure 3B:
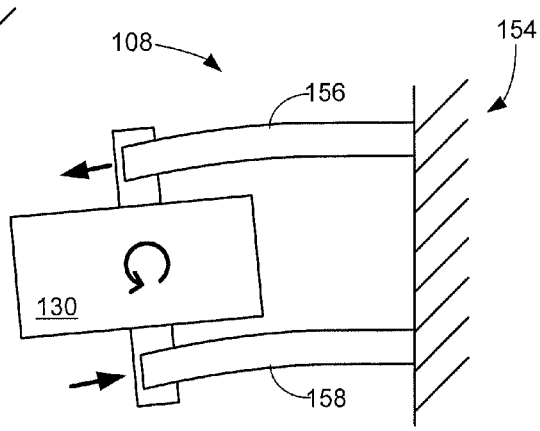

The microactuator 108 includes first and second PZT elements 156, 158 which mechanically interconnect the plate 154 to the suspension and slider 130 (FIG. 1B). Controlled application of voltages to the PZT elements 156, 158 induce rotational displacement of the suspension and slider 130, as schematically depicted in FIGS. 3A and 3B. FIG. 3A depicts a neutral position. FIG. 3B depicts application of a first voltage which lengthens PZT element 156 and a second voltage that shortens PZT element 158. This induces rotational deflection of the suspension and slider 130, and hence the transducer 102, to the left. Similar deflection can be made in the opposing direction by reversing the polarities of the applied voltages.

In some embodiments, the PZT elements are connected such that a positive voltage is applied to one element and a corresponding negative voltage of nominally the same magnitude is applied to the other element, and vice versa. This allows a single PZT voltage value to be applied to both elements 156, 158, with the polarity of the PZT voltage determining deflection direction (e.g. left or right) and the magnitude of the PZT voltage determining the amount of deflection.

Figure 4:
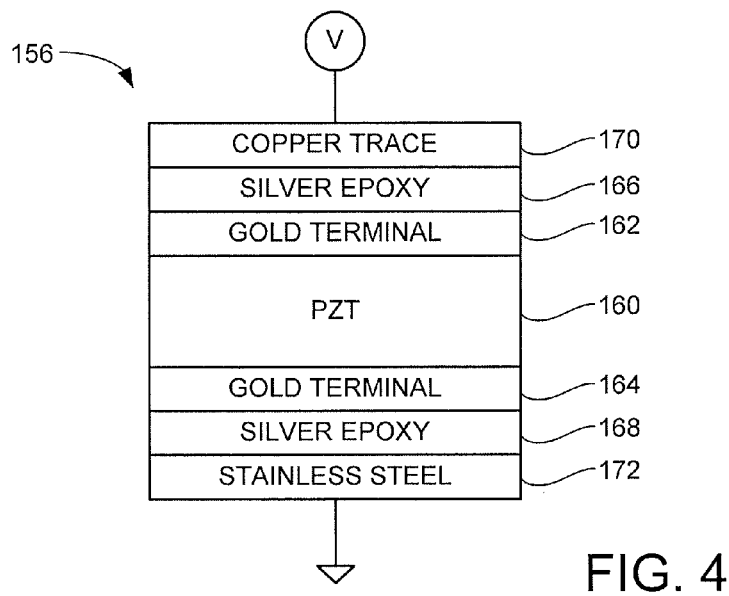
FIG. 4 shows example connection layers of the microactuator portion.

FIG. 4 represents connection layers that can be utilized in each of the PZT elements 156, 158 of FIG. 2 in some embodiments. Other arrangements can be used. The PZT element 156 includes a central block of PZT responsive material 160. Opposing ends of the material 160 are plated with gold to provide conductive terminals 162, 164. Layers of silver epoxy 166, 168 are used to mechanically and electrically interconnect the terminals 162, 164 to a copper trace 170 and a stainless steel chassis 172 of the actuator 140, respectively.

The copper trace 170 may form a portion of a flex circuit 174 attached to the actuator 140 (see FIG. 2). The flex circuit 174 supplies the PZT voltage to the elements 156, 158, as well as data signals to the transducers 102. The stainless steel chassis 172 may be plated with gold or other suitable conductive material. In some embodiments, the silver epoxy can be applied directly to the stainless steel baseplate. In other embodiments, gold plating (or other plating materials) can be added to a localized area on the baseplate to further reduce oxidation and improve interconnectivity.

Figure 5A:
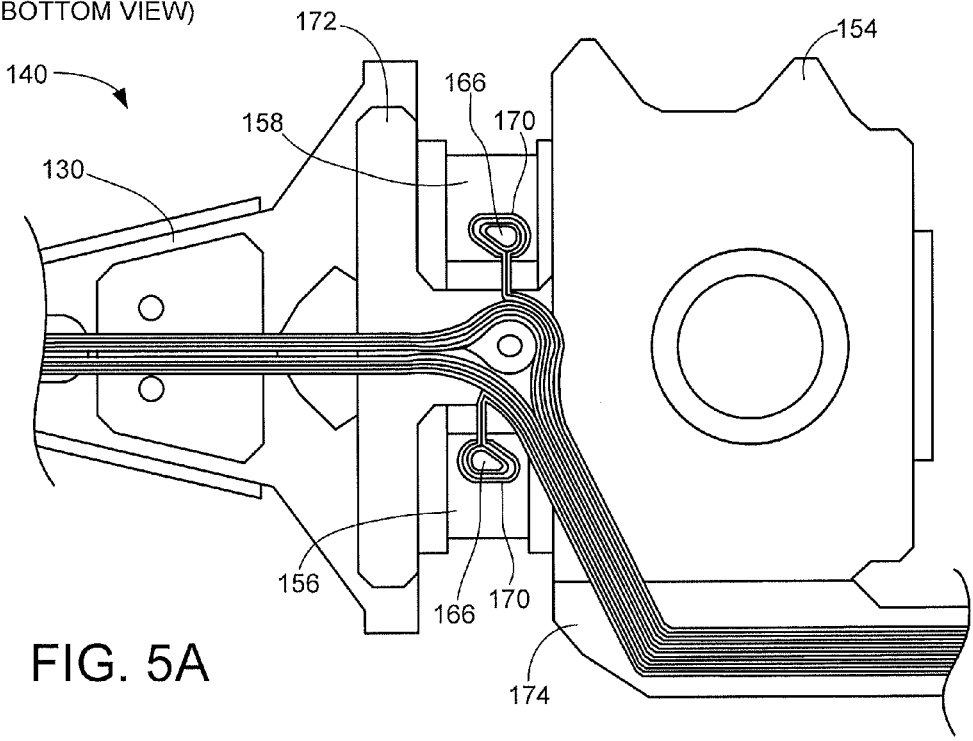
FIGS. 5A and 5B respectively show bottom and top plan views of the actuator to illustrate the various connection layers in FIG. 4.
Figure 5B:
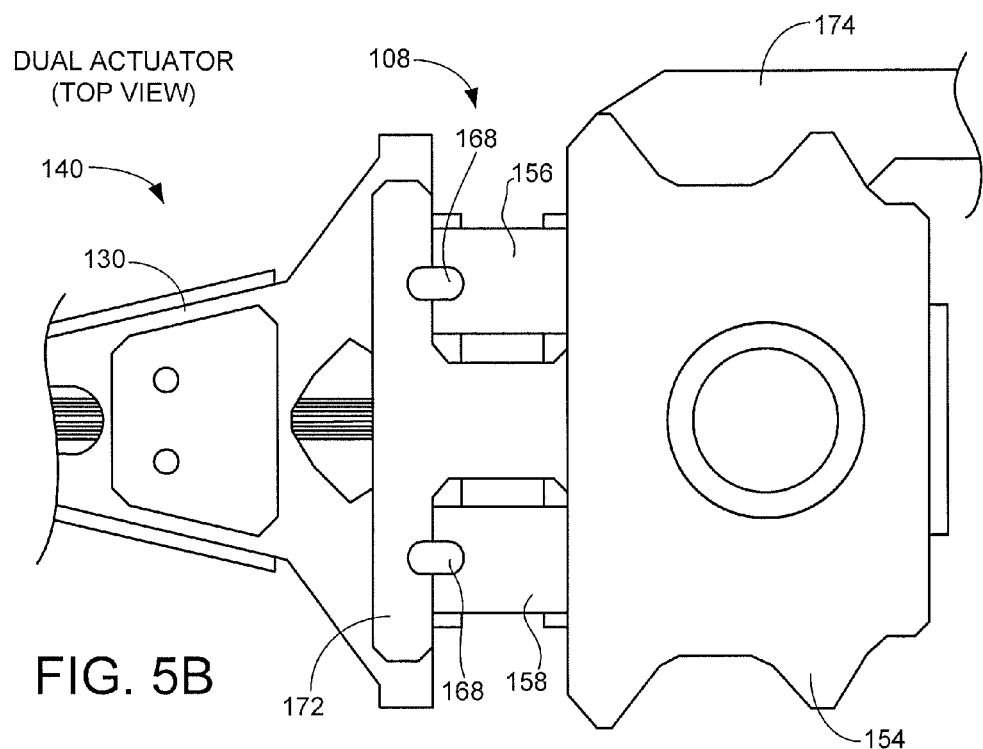

FIG. 5A is a bottom plan view of portions of the actuator 102 to illustrate the connection joints of FIG. 4. The silver epoxy layers 166 secure the copper traces 170 to the PZT elements 156, 158 as shown. FIG. 5B illustrates the silver epoxy layers 168 which interconnect the PZT elements 156, 158 to the stainless steel chassis 172. It will be noted that some or all of the control circuitry depicted in FIG. 1B can be incorporated into the flex circuit 174.

One issue associated with dual actuator designs such as 140 is the potential for periodic change in the electrical impedance of the PZT joints. Such changes can result from a number of factors such as oxidation at the interface between the silver epoxy layers 166, 168 and the other layers (copper traces 170, stainless steel 172), loss of conduction path between the silver flakes within the epoxy, the development of microcracks in the various layers due to thermal expansion cycling and mechanical wear, corrosion, etc. A failure mode that may be manifested over time is an increase in the magnitude and/or change of phase in PZT connection joint impedance.

Figure 6:
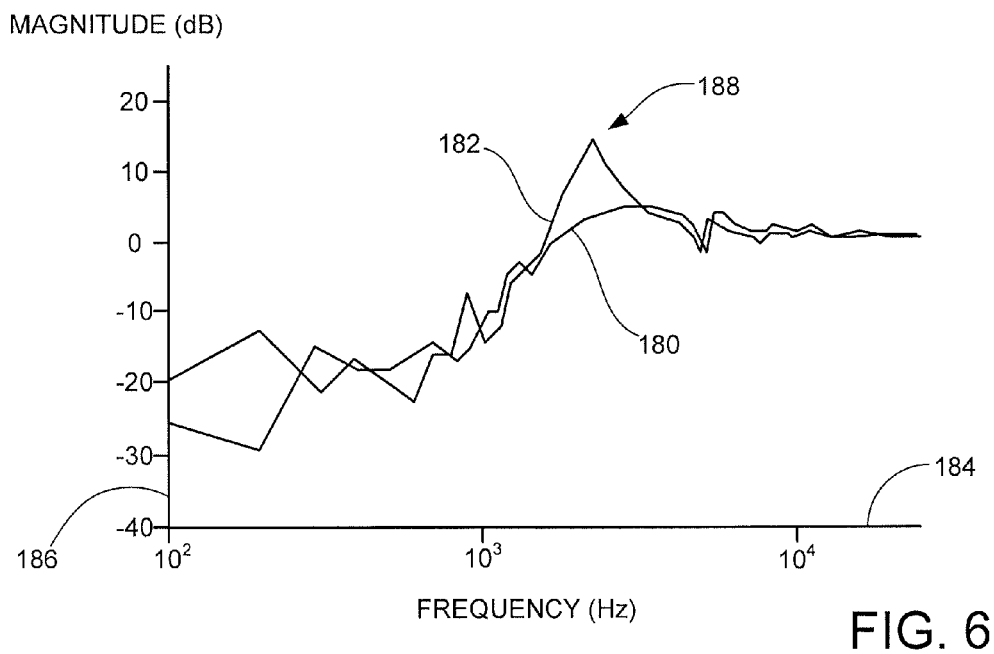
FIG. 6 is a graphical representation of sensitivity response functions illustrating the effects of oxidation in the connection layers of FIG. 4.

Even relatively small impedance changes can introduce instability in the microactuator control loop. FIG. 6 shows a normal loop sensitivity function curve 180 and an abnormal loop sensitivity function curve 182, both plotted against a frequency x-axis 184 and a magnitude y-axis 186. The curve 180 represents normal operation, and curve 182 represents operation in the presence of a localized increase in junction impedance. A localized peak 188 in the abnormal curve 182, caused by oxidation of a PZT joint, represents about a 15 dB increase in sensitivity at the associated frequency (about 2300 Hz) as compared to the normal level provided by baseline curve 180. These and other types of changes to the sensitivity function can cause the microactuator to inadvertently position the data transducer in undesired locations, such as over adjacent tracks during a write operation, etc.

Figure 7:
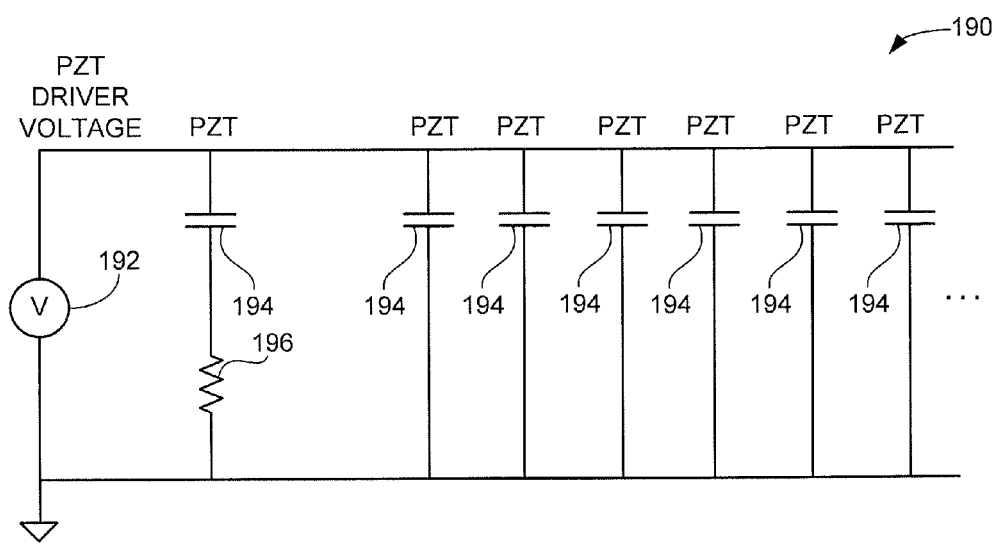
FIG. 7 is a schematic model of the microactuator portion of the system.

Multiple PZT elements in a multi-head application can be modeled as set forth at 190 in FIG. 7. The model circuit 190 includes a voltage source 192 corresponding to the PZT voltage driver 128 (FIG. 1B). Each microactuator in the system is modeled as a capacitor 194. Resistor 196 represents an increased PZT joint impedance for a selected one of the microactuators.

It has been found in some cases that a rapid change in applied voltage may be sufficient to reverse the increased impedance and restore the PZT joint to its normal state. This restoration may be caused by a combination of the applied electrical voltage potential, localized heating, magnetic effects, etc. that allow a PZT joint to exhibit reduced joint impedance. Due to the capacitive nature of the PZT elements, a large step change in voltage can provide an effective transition in voltage at the PZT elements to restore an impedance state.

Figure 8:
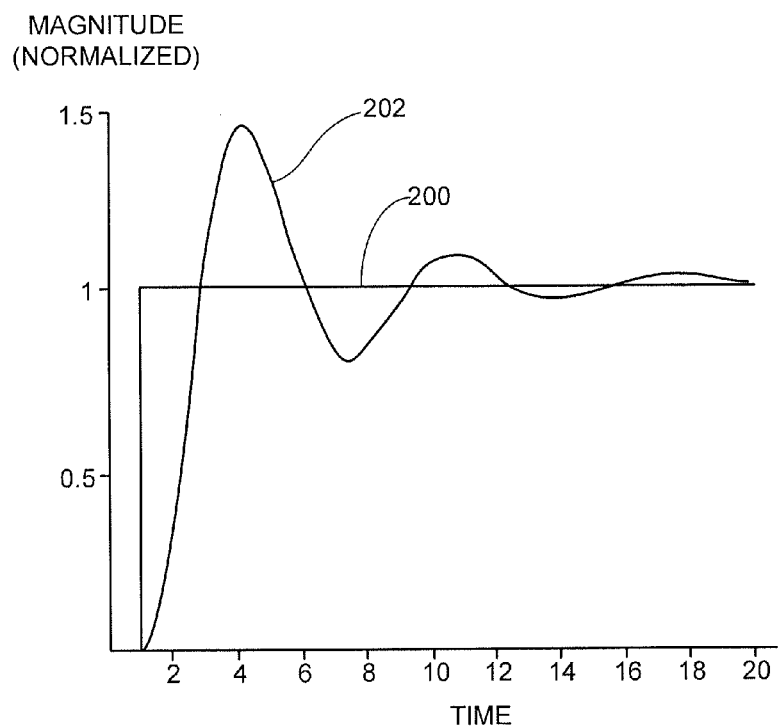
FIG. 8 graphically depicts mechanical displacement responsive to application of a stepwise microactuator voltage input.

As depicted by FIG. 8, a large step function of applied voltage, represented by voltage curve 200, will tend to induce a correspondingly large mechanical displacement of the transducer, as depicted by displacement curve 202. Such displacement can be detrimental for a number of reasons. A large stepwise voltage change may excite large harmonic resonances in the actuator structure. This raises the possibility of damage to the transducers, discs and/or PZT elements. Large stepwise displacements can also affect the fly height of the transducers due to oscillations, and can introduce large dc offsets in the positioning model which must be subsequently compensated to ensure continued controlled positioning of the transducers until the induced offset can be gradually removed.

Figure 9:
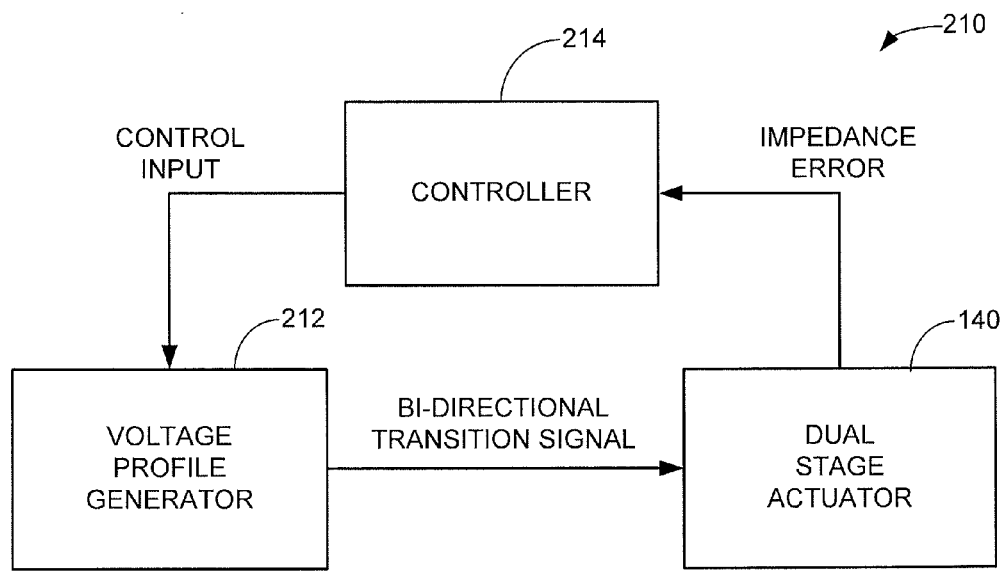
FIG. 9 is a functional block diagram of control circuitry operable in accordance with some embodiments to mitigate increases in impedance in the microactuator portion of the system.

Accordingly, various embodiments of the present disclosure operate to apply one or more specially configured, variable voltage profiles to the dual stage actuator 140 to mitigate increased PZT connection joint impedance. FIG. 9 depicts a control circuit 210 having a voltage profile generator 212 and a controller 214. The controller 214 may be a hardware or software based processor or other circuit. The generator 212 may correspond to the PZT driver 128 or may constitute a separate voltage driver.

During operation, an increased impedance error will be detected by the controller for a selected microactuator 108. This can be detected in a variety of ways, such as a slower than normal or otherwise abnormal response to a control input to position the associated transducer 102 at a desired position. Offline self-testing can be carried out by the controller 214 to detect one or more impedance errors.

At an appropriate point in time the controller 214 directs the voltage profile generator 212 to apply a voltage profile in the form of a series of pulses to the dual stage actuator 140 to mitigate the impedance error. The voltage profile is selected to result in minimal mechanical disturbance to the transducer. That is, the voltage profile involves a significant stepwise voltage input, but at a frequency or other characteristic shape and/or timing such that the pulse results in substantially no mechanical deflection of the transducer.

Figure 10:
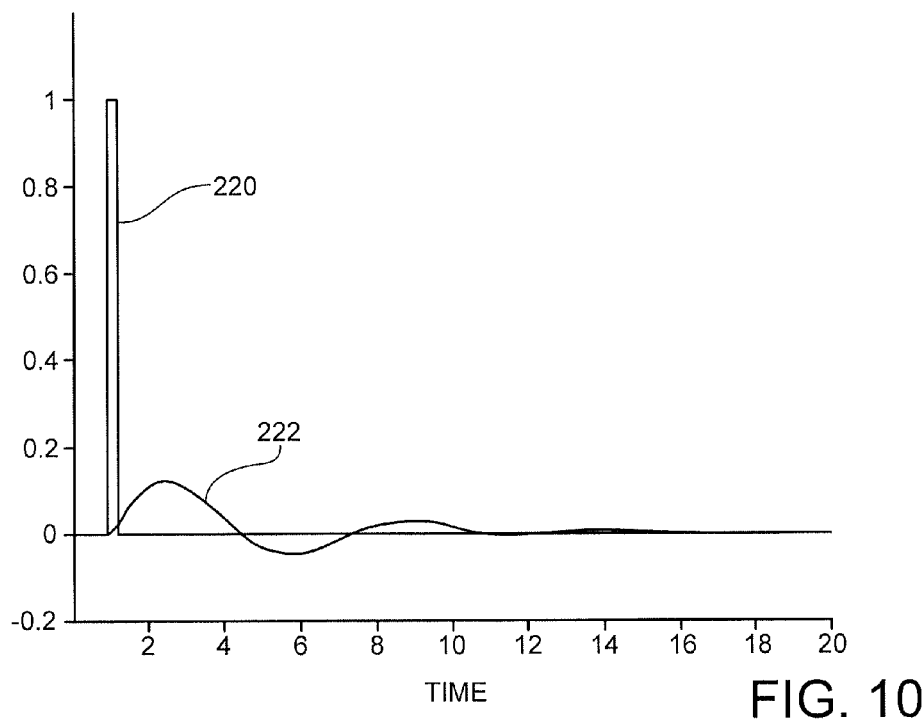
FIG. 10 is a first type of bi-directional transition signal that may be employed by the circuitry of FIG. 9.

A first voltage profile that may be provided by the voltage profile generator 212 is depicted at 220 in FIG. 10. The voltage profile 220 is normalized over an amplitude interval of from 0-1, and is significantly shorter in duration than the sampling interval of the servo control loop (e.g., 1-2 microseconds v. 10-20 microseconds, etc.). The corresponding displacement of the transducer resulting from the applied pulse 220 is depicted by displacement curve 222.

The pulse 220 can be made as short as possible by stepping the voltage down to its original level as soon as the target voltage change has been reached. It has been observed that short duration pulses such as 220 do not tend to introduce dc offsets into the head position loop. Because the pulse duration is very short relative to the servo sample period, the pulse can be embedded within one sample period of the digital control scheme. This results in substantially no detectable dc shift in the command head position from one sample to the next.

The microactuator loop has a system mode of several kilohertz (e.g., 2,000-8,000 Hz, etc.). Using pulses on the order of about 1 microsecond or less place the pulse frequency outside the response range of the loop, further ensuring that the pulses do not introduce head displacement. Using the bi-directional transition signal or pulse (leading and trailing edges) 220 further has the advantage of applying two successive stepwise voltage changes to the junction, increasing the ability to restore the affected joint.

Figure 11:
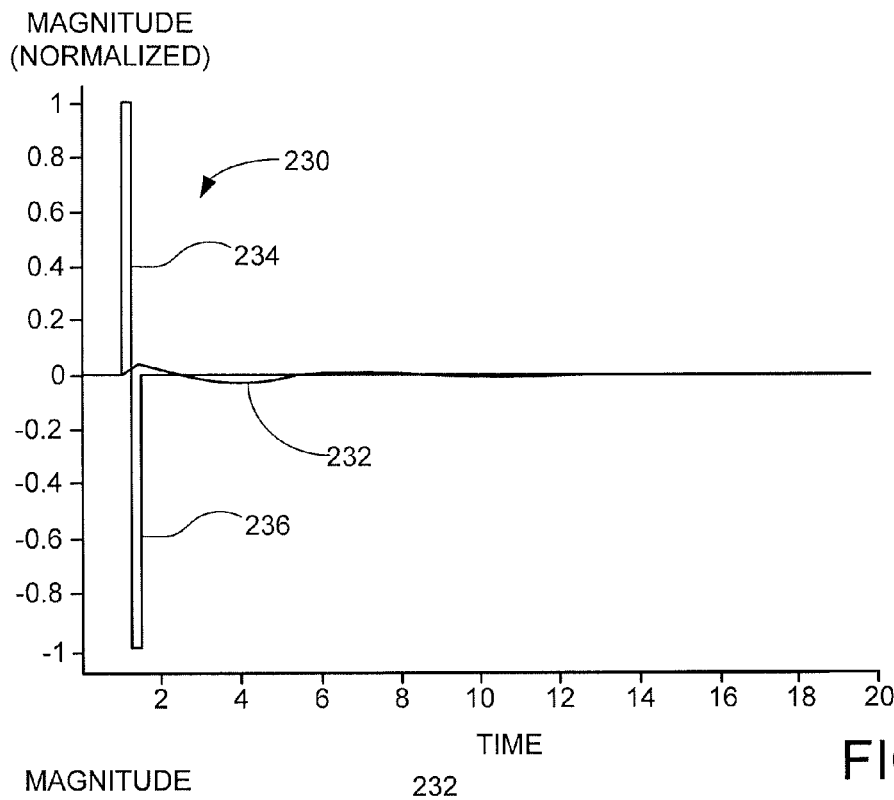
FIG. 11 is a second type of bi-directional transition signal that may be employed by the circuitry of FIG. 9.

FIG. 11 provides a second voltage profile 230 that may be supplied by the voltage profile generator 212 of FIG. 9. Corresponding mechanical displacement of the transducer is represented by response curve 232. The profile 230 has successive first and second pulses 234, 236 of opposing polarity and nominally equal magnitude. As before, the profile 230 has been found to mitigate PZT junction impedance issues without inducing significant mechanical deflection.

The transition from the first pulse 234 to the second pulse 236 generates a voltage step that is twice as large as the individual steps (e.g., a voltage swing from +1 to −1 as compared to a voltage swing from 0 to +1 or −1 to 0). This larger voltage step may in some cases provide an enhanced ability to restore a larger distribution of affected joints.

It will be noted that the first pulse 234 acts as an impulse to produce a vibration waveform in the mechanical structure of the actuator 140. The second pulse 236 acts to produce a second vibration waveform that is of the same shape but out of phase by substantially 180 degrees (and slightly delayed in time). By keeping the pulse duration small, the phase delay of the second waveform compared to the first waveform will also remain small. Thus, the two waveforms will tend to cancel each other out through superposition. This further reduces the mechanical perturbation of the system; notice the smaller response 232 in FIG. 11 as compared to the slightly larger response 222 in FIG. 10.

Figure 12:
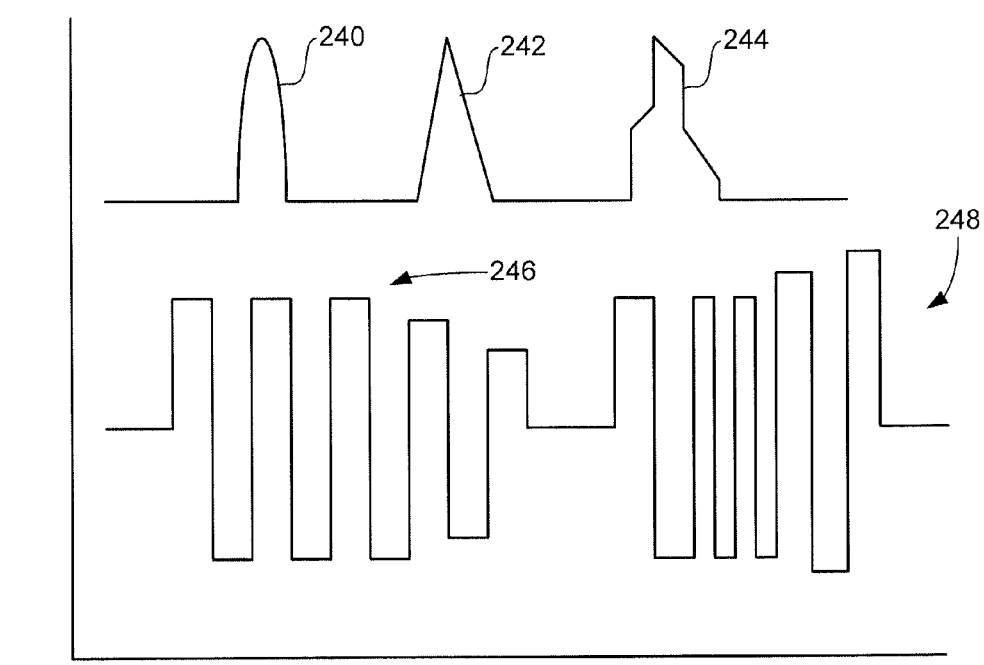
FIG. 12 sets forth additional types of bi-directional transition signals that may be employed by the circuitry of FIG. 9.

Other wave forms and pulse shapes are contemplated, as shown in FIG. 12. While substantially square wave shaped pulses may be used, other shapes such as a sinusoidal/curvilinear pulse 240, triangular waveform 242 and complex pulse 244 can be applied, so long as the pulses are of sufficiently short duration so as to not induce unwanted mechanical displacement.

Waveforms can be repeated as shown at 246 and 248, and can vary in magnitude as well as frequency. By increasing the number of voltage step events, the probability of successfully restoring a given joint may be increased in relation to the increased number of repetitions.

While the various voltage profiles are applied responsive to the detection of an affected joint, it will be appreciated that, because the voltage profiles tend to not induce mechanical displacement, the profiles can be periodically applied during normal operation. It is believed that such preventive operations may tend to reduce and revert corrosion, oxidation or other effects early in the process.

Figure 13:
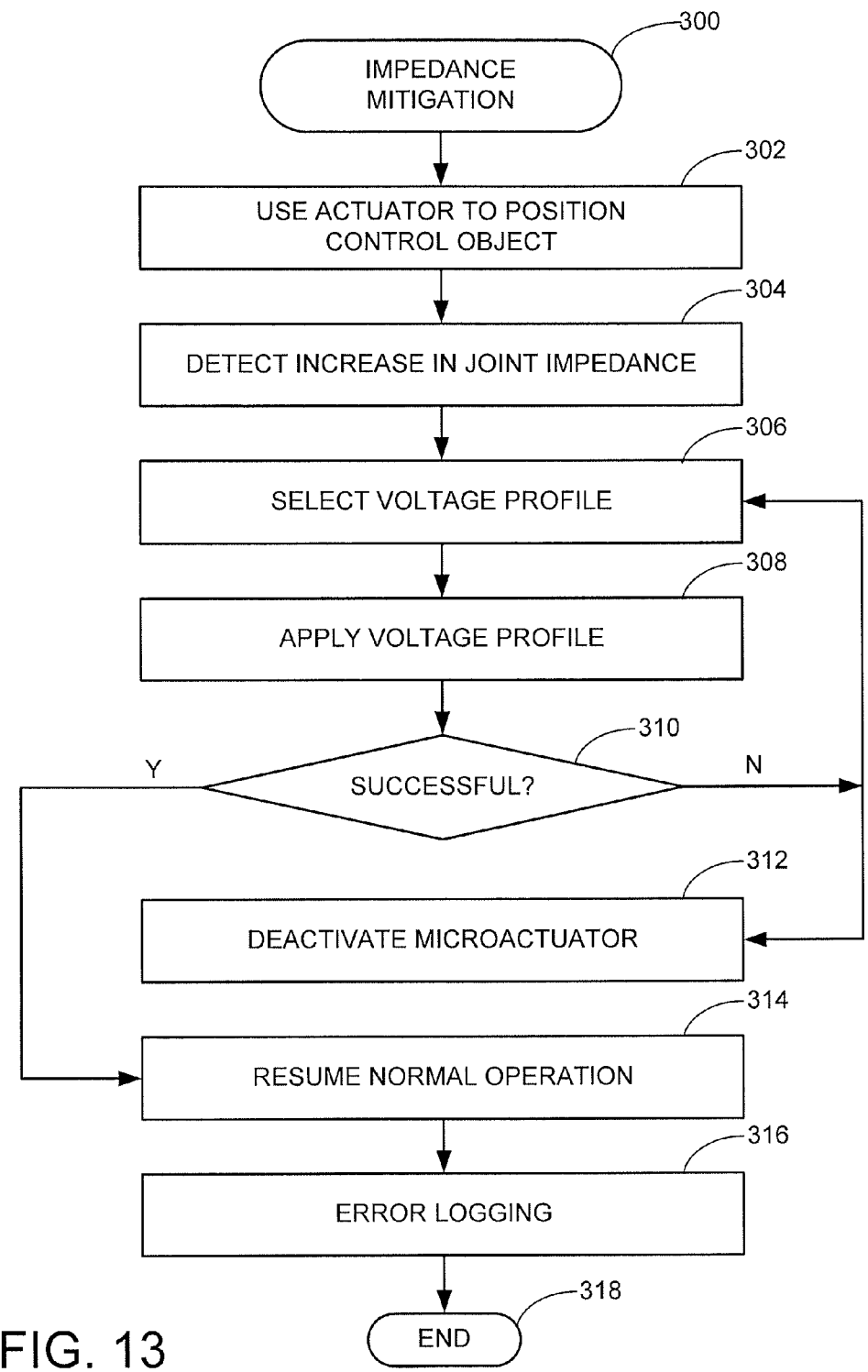
FIG. 13 is an IMPEDANCE MITIGATION routine.

FIG. 13 is a flow chart for an IMPEDANCE MITIGATION routine 300. It is contemplated that the routine is carried out by circuitry such as depicted in FIG. 9 under the direction of a controller such as 214. Such is merely for purposes of illustration and is not limiting.

An actuator is provided at step 302 to position a control object, such as the dual stage actuator 140 presented above in FIGS. 1-2. The actuator includes a microactuator stage with a connection joint that incorporates adjacent dissimilar metals. It is contemplated that increases in electrical impedance at the joint can arise from time to time.

Such an increase is detected at step 304. This can be carried out during normal operation; for example, a commanded track following operation may result in excessive movement and overcorrection of head position, and such control errors may be deduced to be a result of an affected microactuator joint. The routine of FIG. 13 can thus be used as part of a corrective action routine of a data storage device or other system.

A suitable voltage profile is selected at step 306. Examples include the single pulse 220 of FIG. 11, the double pulse 230 of FIG. 12, the shaped and repetitive pulses of FIG. 12, and so on. In some cases, a succession of different types of profiles might be applied in turn in an effort to resolve the error.

The voltage profile is next applied at step 308. A test can be carried out at step 310 to determine whether the error was cleared by the applied voltage profile. Such testing can include measuring an amount of overall deflection responsive to a known microactuator voltage input, by direct measurements of the circuit, etc. If the test was unsuccessful, steps 306 and 308 may be repeated as shown.

Ultimately, if the errors persist after the application of multiple voltage profiles, a more serious problem may be declared and the microactuator stage may be deactivated, step 312. On the other hand, if the errors are successfully resolved, the routine passes to step 314 where normal operation resumes. As desired, error logging and host reporting can be provided at step 316, and the routine ends at step 318.

It will be appreciated that the various embodiments disclosed herein can operate to allow restoration of PZT joint impedance without incurring risks to data loss, disturbances to track following, damage to the system, delays in data transfers, and so on. The system firmware of a data storage device can safely invoke the mitigation technique as desired under recovery conditions upon detection of an impaired track, or in a maintenance mode during normal or offline processing.

While the use of piezoelectric transducers (PZT) elements has been provided as an illustrative example, such is merely for purposes of illustration and is not limiting. Other forms of microactuators can be used including magnetostriction elements, electrostatic elements, thermal elements, etc. While discontinuities using dissimilar metals have focused on the interaction of silver epoxy with other conductive materials (gold, stainless steel, copper, etc.), such is merely exemplary and not limiting.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a microactuating element comprising a conductive input junction of dissimilar metals, the microactuating element adapted to mechanically deform to displace a control object responsive to a microactuation control signal applied to the conductive input junction; and
   a control circuit adapted to apply a bi-directional transition signal to the conductive input junction to reduce an increased impedance thereof.

2. The apparatus of claim 1, wherein the bi-directional transition signal transitions from a first level to a second level at a frequency higher than a response frequency of a control loop associated with the microactuating element so that the microactuating element does not mechanically displace the control object responsive to the bi-directional transition signal.

3. The apparatus of claim 1, in which the bi-directional transition signal comprises a single pulse having a leading edge transition and a trailing edge transition.

4. The apparatus of claim 3, wherein the single pulse has a pulse length of about 1 microsecond or less.

5. The apparatus of claim 1, wherein the bi-directional transition signal comprises successive first and second pulses, the first pulse having a magnitude with a first polarity and the second pulse having a magnitude with an opposite second polarity, the first pulse having a leading edge and a trailing edge, the second pulse having a leading edge and a trailing edge, and the trailing edge of the first pulse aligned with the leading edge of the first pulse so that the signal transitions from the magnitude of the first pulse to the magnitude of the second pulse as a single step.

6. The apparatus of claim 1, wherein the bi-directional transition signal comprises a succession of pulses that increase or decrease in magnitude over time, each pulse having a pulse width of insufficient length to induce movement of the control object by the microactuating element.

7. The apparatus of claim 1, in which the microactuating element is a piezoelectric transducer (PZT) element.

8. The apparatus of claim 7, wherein the microactuating element comprises two PZT elements in tandem.

9. The apparatus of claim 1, in which one of the dissimilar metals is silver in a silver epoxy compound.

10. The apparatus of claim 1, wherein the increased impedance is induced by oxidation of a silver/stainless steel junction.

11. The apparatus of claim 1, wherein the microactuating element is a microactuator in a dual stage actuator of a data storage device used to position a data read/write transducer adjacent a data recording medium, wherein the microactuator provides fine positional control and a voice coil motor (VCM) provides coarse positional control.

12. An apparatus comprising:
    a dual stage actuator comprising a voice coil motor (VCM) adapted to provide coarse positional control of a data transducer and a microactuator adapted to provide fine positional control of the data transducer, the microactuator comprising a conductive input junction having dissimilar first and second metals in contact with one another;
    a control circuit adapted to apply coarse positioning signals to the VCM and fine positioning signals to the microactuator to move the data transducer; and
    a voltage profile generator adapted to apply a bi-directional transition signal to the microactuator to reduce an impedance of the conductive input junction.

13. The apparatus of claim 12, wherein the bi-directional transition signal is applied concurrently with the application of the fine positioning signals, wherein the bi-directional transition signal is of sufficiently high frequency so as to not change the position of the data transducer.

14. The apparatus of claim 12, wherein the conductive input junction comprises a silver epoxy compound subjected to oxidation, and wherein the bi-directional transition signal mitigates said oxidation.

15. A method comprising:
    positioning a control object using a microactuating element, the microactuating element having a conductive input junction with dissimilar first and second metals in contact with one another; and
    applying a bi-directional transition signal to the conductive input junction to reduce an increased impedance thereof, wherein the control object is positioned independently of the bi-directional transition signal.

16. The method of claim 15, wherein the bi-directional transition signal transitions from a first level to a second level at a frequency higher than a response frequency of a control loop associated with the microactuating element so that the microactuating element does not mechanically displace the control object responsive to the bi-directional transition signal.

17. The method of claim 15, in which the bi-directional transition signal is a single pulse having a leading edge transition and a trailing edge transition.

18. The method of claim 15, in which the bi-directional transition signal is a dual pulse pattern of successive first and second pulses, the first pulse having a magnitude with a first polarity and the second pulse having a magnitude with an opposite second polarity, the first pulse having a leading edge and a trailing edge, the second pulse having a leading edge and a trailing edge, and the trailing edge of the first pulse aligned with the leading edge of the first pulse so that the signal transitions from the magnitude of the first pulse to the magnitude of the second pulse as a single step.

19. The method of claim 15, wherein the bi-directional transition signal comprises a succession of pulses that increase or decrease in magnitude over time, each pulse having a pulse width of insufficient length to induce movement of the control object by the microactuating element.

20. The method of claim 15, in which the microactuating element is a piezoelectric transducer (PZT) element.

* * * * *